United States Patent [19]

Sharp

[11] Patent Number: 5,441,718
[45] Date of Patent: Aug. 15, 1995

[54] PROCESS FOR MAKING INORGANIC GELS

[75] Inventor: Kenneth G. Sharp, Landenberg, Pa.

[73] Assignee: E. I. Du Pont de Nemours and Company, Wilmington, Del.

[21] Appl. No.: 128,437

[22] Filed: Sep. 29, 1993

Related U.S. Application Data

[63] Continuation-in-part of Ser. No. 885,793, May 20, 1992, abandoned.

[51] Int. Cl.$^6$ .............................................. C01B 33/12
[52] U.S. Cl. .................................... 423/338; 502/233; 252/315.6
[58] Field of Search ...................... 423/338; 502/233; 252/315.6; 501/12, 154

[56] References Cited

U.S. PATENT DOCUMENTS

| | | | |
|---|---|---|---|
| 4,941,993 | 7/1990 | Strehlow et al. | 252/315.6 |
| 4,954,327 | 9/1990 | Blount | 423/330 |
| 4,961,767 | 10/1990 | Schemerhorn et al. | 65/2 |

FOREIGN PATENT DOCUMENTS

| | | | |
|---|---|---|---|
| 865791 | 9/1981 | U.S.S.R. | 423/338 |

OTHER PUBLICATIONS

Sumio Sakka, Hiromitsu Kozuka and Sai-Hun Kim, Various Factors Affecting the Conversion of Silicon Alkoxide Solutions to Gels, *Ultrastructure Processing of Advanced Ceramics*, pp. 159–171, 1988.

Bradley K. Coltrain, Sharon M. Melpolder and John M. Salva, Effect of Hydrogen Ion Concentration on Gelation of Tetrafunctional Silicate Sol-Gel Systems, *Ultrastructure Processing of Advanced Materials*, pp. 69–76, 1992.

*Primary Examiner*—Olik Chaudhuri
*Assistant Examiner*—Thomas G. Bilodeau

[57] ABSTRACT

A process for making inorganic gels by reaction of tetraalkoxy orthosilicates, tetraalkoxy titanates and tetraalkoxy zirconates with strong carboxylic acids. Water need not be present initially as a reactant. Optically clear, very small pore size, narrow pore size distribution, and high specific area inorganic gels useful for abrasion-resistant coatings, optical applications, catalyst or enzyme support, gas separation, or chromatography packing are thus produced.

9 Claims, 1 Drawing Sheet

PROCESS FOR MAKING INORGANIC GELS

CROSS-REFERENCE TO PRIOR APPLICATION

This is a continuation-in-part of my application Ser. No. 7/885,793 filed May 20, 1992, now abandoned.

BACKGROUND OF THE INVENTION

This invention relates to a rapid, nonaqueous process for producing optically clear, inorganic gels of silicon, titanium and zirconium.

The above-described inorganic gels can be dried to form strong, hard, optically clear compositions that are useful as abrasion-resistant and controlled refractive index coatings in optical applications such as, for example, lenses and windows. They may be used as dielectric coatings and anti-corrosive coatings. Additionally, the gels have a pore structure of extremely small size, high specific surface area and narrow pore size distribution which makes them useful for catalyst or enzyme support, gas separation and in chromatography as column packing.

Inorganic gels of silicon, titanium and zirconium are typically created by hydrolysis of organo-silicon, -titanium and -zirconium compounds, and subsequent condensation of the hydrolysis products. For silica gels, hydrolysis, (I), and condensation, (II) and (III), are represented by the following equations:

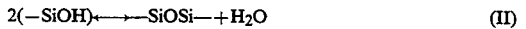
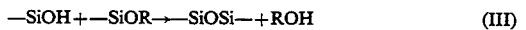

where R is an alkyl group.

Hydrolysis and condensation reactions are normally catalyzed by acids or bases.

Existing methods of producing small pore size, high specific surface area, inorganic gels suffer from a number of problems. As discussed by C. Plank et al. in *J. Colloid Sci.*, 2, 399 (1947) small pore, high surface area gel is ideally produced near the isoelectric point which for silica is about pH of 2. However, acid-catalyzed condensation reaction is so slow that several weeks or longer may be required for gelation to occur at about 25° C. at this pH. If condensation is conducted at elevated temperature, complete gelation can occur in less time; however, pore size will increase and surface area will decrease. In general, alkaline or fluoride ion catalyzed gelation is faster but produces larger pore size gels than acid catalyzed gelation and may lead to opaque gels. Another problem is that many conventional processes use alcohol as solvent for reactants. Presence of alcohol enhances the reverse of reactions (I) and (III) which hinders production of gel.

U.S. Pat. No. 4,950,779 (Wengrovius, et al.) discloses a process for making organosilicon oligomers by reacting polyalkoxysilanes or polyaminosilanes with formic acid without addition of water. Wengrovius' products are organosilicon oligomers of low molecular weight, in contrast to gels of silicon dioxide which are completely crosslinked networks of unlimited molecular weight. Wengrovius' silicone oligomers contain at least one non-hydrolyzable organic substituent on each silicon atom which limits the ability of the oligomers to form gel.

Coltrain et al. demonstrate in a paper presented at a 1989 conference and published in *Ultrastruct. Process.* *Adv. Mater.*, Wiley, N.Y., N.Y., 1992, pp.69-76, that the rate of acid-catalyzed hydrolysis of tetraalkoxysilanes and formation of gels depends on the pH of the medium. For a strong organic acid such as trifluoroacetic acid, the rate of reaction in an aqueous medium slows down as the concentration of the acid increases.

It is desirable to provide a rapid process requiring only as much water as necessary to propagate reaction, for the synthesis of open pore, inorganic gels having fine pore structure.

SUMMARY OF THE INVENTION

According to the present invention, there is now provided a process for making open pore, inorganic gel, comprising:

(1) intimately mixing together the following components (A) and (B), either in a liquid state or in solution in an organic liquid:

(A) at least one compound selected from the group consisting of $Si(OR^1)_4$, $Ti(OR^2)_4$, $Zr(OR^3)_4$, $Ti^a(OR^4)_nX^d_p$, and $Zr^b(OR^5)_nX^d_p$ wherein each one of $R^1$, $R^2$, $R^3$, $R^4$, and $R^5$ independently is a $C_1$–$C_8$ alkyl;

X is a chelating ligand;

each one of a and b is independently a coordination number having an integer value of 4–6;

d is a number corresponding to the chelating ability of ligand X, being 2 for bidentate chelating ligands and 3 for tridentate chelating ligands;

p is either 1 or 2, with the proviso that p is 1 for tridentate chelating ligands;

$n = a - d \cdot p$; and (B) a strong carboxylic acid, having a $pK_a$ value not higher than about 4.0, and containing from 0 to 40 mole % water, the amount of carboxylic acid being at least 1.5 moles of —COOH groups per mole of compound (A), and the total amount of water from any source initially present in the reaction medium being less than 5 moles, and preferably less than 1 mole, per mole of Component (A);

(2) agitating the above mixture while maintaining the mixture at a temperature within the range of about 0° to 100° C.; and (3) isolating the inorganic gel.

There is also provided a process for synthesis of inorganic gel having extremely fine pore structure.

DETAILED DESCRIPTION OF THE INVENTION

Figure 1:
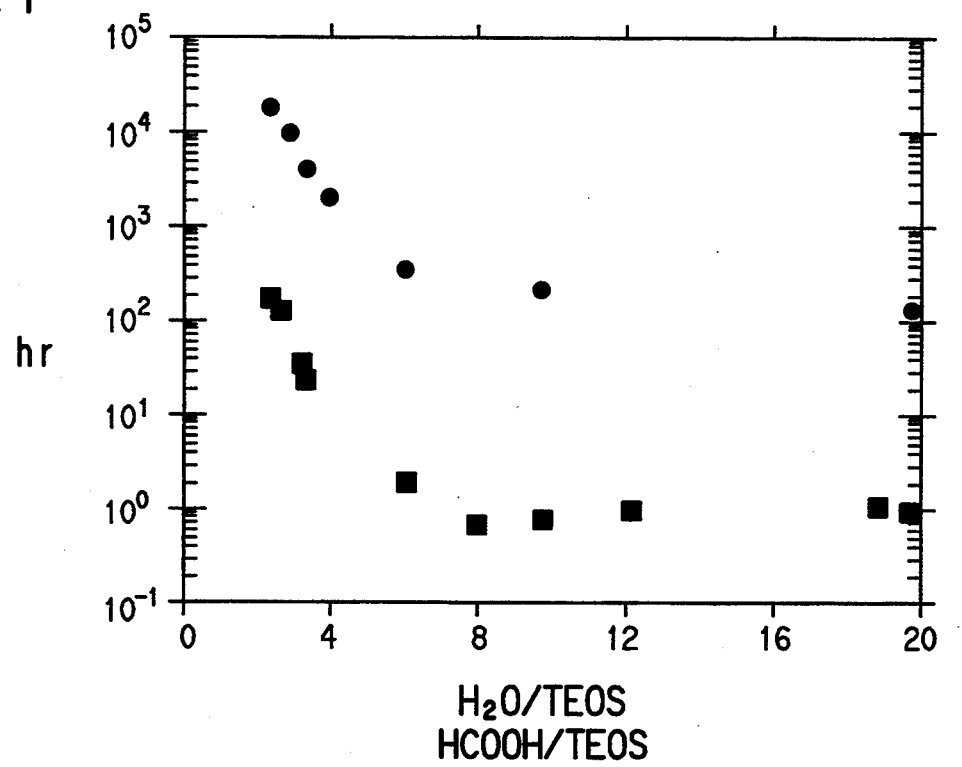
FIG. 1 is a combination plot of gel time vs. hydrolytic agent:tetraethyl orthosilicate mole ratio for two series of experiments at 20° C., one in which the hydrolytic agent was water and reaction was catalyzed by hydrochloric acid, and the other in which the hydrolytic agent was 96 wt % formic acid.

The process of this invention can produce an open pore, very small pore size, inorganic gel structure, occasionally hereinafter referred to as "ultrafine pore structure". The term "open pore" means a structure having voids which are interconnected and are accessible by an unobstructed path to the surface. Pore size of ultrafine pore structure has not been measured directly but is believed to be smaller than about 2 nm. Ultrafine pore structure is identified by specific surface area and density measurements. More specifically, ultrafine pore structure is detected by subjecting a gel to adsorption analysis by ASTM standard C1069-86 which measures nitrogen adsorption at $-196°$ C. in four hours. This method, sometimes hereinafter referred to as "low-temperature nitrogen analysis", is suitable for determining the specific surface area of gel having open pores into which nitrogen readily diffuses at $-196°$ C. Such pores are usually larger than about 1.5 nm. An open pore gel which indicates less than 10 $m^2/g$ specific surface area by low-temperature nitrogen analysis has ultrafine pore structure.

To determine that a gel which indicates less than 10 $m^2/g$ has open porosity, it should be tested by both low pressure mercury porosimetry bulk density analysis according to ASTM standard C493( 15.01 ), and helium pycnometry skeletal density analysis as described by T. Woigner et al. in J. Non-cryst. Solids 93, 17 (1987). Bulk density analysis provides the mass per unit volume of gel including the volume of void space of open pores. Skeletal density analysis provides the density of solid gel excluding open pore volume. If skeletal density of a given gel is higher than its bulk density, then the gel has open porosity. However, if skeletal density is equal to bulk density, the gel may either be nonporous or have closed pores.

Gel made by the process of this invention which indicates greater than 10 $m^2/g$ specific surface area by low-temperature nitrogen analysis may have a pore size distribution which includes ultrafine pore structure as well as pores larger than about 1.5 nm. A high diffusion rate adsorption analysis can sometimes be used to identify ultrafine pore structure in such gel. A suitable high diffusion rate adsorption analysis is provided by modifying the ASTM C 1069-86 test procedure, for example, by conducting the procedure at temperature higher than $-196°$ C., (hereinafter, "high-temperature nitrogen analysis") or by substituting carbon dioxide for nitrogen and conducting the procedure at $-78°$ C. or higher (hereinafter, "$CO_2$ analysis"). Under such conditions, diffusion of adsorbate into ultrafine pores occurs more rapidly than during low-temperature nitrogen analysis. The BET method described in the Journal of the American Chemical Society, S. Brunauer et al., 60, page 309 (1938), can be used to calculate specific surface area of gel tested by adsorption analyses. Because the BET method relies on certain assumptions about pore geometry which may not be true for ultrafine pore structure, it may not accurately calculate pore sizes and specific surface area of gel containing such structure. Nevertheless a gel is believed to have ultrafine pore structure when $CO_2$ or high-temperature nitrogen analysis indicates specific surface area more than that indicated by low-temperature nitrogen analysis. If $CO_2$ or high-temperature nitrogen analysis does not exceed specific surface area indicated by low-temperature nitrogen analysis, no conclusion can be drawn that the gel possesses ultrafine pore structure.

Compounds (A) are tetraalkyl orthosilicates Si-$(OR^1)_4$, tetraalkyl titanates Ti$(OR^2)_4$, tetraalkyl zirconates Zr$(OR^3)_4$, chelated titanates Ti$^a(OR^4)_nX^d_p$, and chelated zirconates Zr$^b(OR^5)_nX^d_p$, sometimes hereinafter collectively referred to as "tetraalkoxy compounds". The present invention is based on the discovery that tetraalkoxy compounds, which either are soluble in strong carboxylic acids or are soluble in nonaqueous solvents for strong carboxylic acids, readily react in the presence of significantly less than stoichiometric amounts of water or initially without any water to produce inorganic gels.

$R^1$, $R^2$, $R^3$, $R^4$ and $R^5$ are linear, branched, acyclic or alicyclic groups. Illustrative of such acyclic groups are ethyl, propyl, butyl, hexyl, 1-methylethyl, 2-methylpropyl, 1-methylpropyl, 1,1-dimethylethyl and 2,2-dimethylpropyl groups. Illustrative of such alicyclic groups are cyclobutyl, cyclopentyl and cyclohexyl groups.

Chelating compounds suitable for use in the present invention are chemicals containing chelating ligands capable of bonding to titanium or zirconium through two or more oxygen atoms. Illustrative of compounds containing bidentate chelating ligands, $X^2$, is acetylacetone. Illustrative of compounds containing tridentate chelating ligands, $X^3$, is triethanolamine.

Examples of tetraalkyl orthosilicates suitable for use in this invention include: tetramethyl orthosilicate, tetraethyl orthosilicate (TEOS), and tetra(n-propyl) orthosilicate. It is to be noted that the above organosilicon compounds can be named in two different ways, and both nomenclatures are generally accepted and understood by those skilled in the art. The alternative nomenclature is "tetraalkoxysilanes", for example, tetraethoxysilane and tetramethoxysilane. Examples of suitable tetraalkyl titanates include: tetraisopropyl titanate, tetra(n-butyl) titanate and tetra(2-ethylhexyl) titanate. Representative of bidentate chelated titanates is titanium triisopropoxide- 2,4-pentanedionate and representative of tridentate chelated titanates is isopropoxy(triethanolaminato-)titanium. An example of tetraalkyl zirconates is tetra(n-propyl) zirconate and an example of chelated zirconates is zirconium bis(acetoacetonate)-diisopropylate.

Inorganic gel of either exclusively one of silicon, titanium and zirconium or a mixture of them, can be produced by hydrolyzing and condensing the corresponding tetraalkoxy compound or appropriate mixture of tetraalkoxy compounds. In general, titanium- and zirconium-containing inorganic gel has higher refractive index than silicon gel. Gels can be made within broad ranges of silicon/titanium/zirconium compositions by controlling the reactant mixture ratios of silicon:titanium:zirconium tetraalkoxy compounds accordingly. Gels made by the process of this invention typically may have a small amount of unreacted alkoxy and hydroxy groups on the silicon, titanium and zirconium atoms.

To obtain rapid gel formation, strong carboxylic acids suitable for use in the present invention should be capable of attaining homogeneous, liquid phase contact with tetraalkoxy compounds. Consequently, such strong carboxylic acids are either liquid and miscible with tetraalkoxy compounds under reaction conditions or soluble in solvents for tetraalkoxy compounds at reaction conditions. Either strong carboxylic acid or tetraalkoxy compound can be first dissolved in solvent and the other reactant added to the resulting solution. Alternatively, both reactants can be separately dissolved in either the same or different solvents and the two solutions combined. Suitable solvents for use in the present invention are nonaqueous, polar and aprotic. Illustrative of such solvents are tetrahydrofuran, acetone, acetonitrile and dichloromethane. Presence of solvent dilutes the concentrations of carboxylic acid, and tetraalkoxy compound, which generally slows gel formation, but gel formation rate can be increased by raising reaction temperature. Solvents capable of forming hydrogen bonds with silanol (Si—OH) groups, such as, for example, tetrahydrofuran and alcohols, also can slow the gelation rate by impeding the condensation reaction of the silanol groups Strong carboxylic acid which is solid at room temperature can be used without a solvent if heated above the melting point in order to mix it with tetraalkoxy compound in the liquid state. Such high temperatures can increase reaction rates dramatically but can inhibit formation of ultrafine pore structure. Therefore, to avoid using too high a temperature, it is preferred to dissolve solid acids in suitable solvents at about room temperature when production of ultrafine pore structure gel is desired.

It is generally desirable to carry out hydrolysis and condensation at a temperature in the range of 0°–100° C., and preferably in the range of 0°–60° C. Reaction temperature in the range of 0°–30° C. is most favorable for the formation of ultrafine pore structure. Operation in the strong carboxylic acid to tetraalkoxy compound mole ratio range from 2:1 to 10:1, and preferably from 3:1 to 5:1, also favors production of ultrafine pore structure. The process of this invention therefore provides the advantage of producing gels having ultrafine pore structure that has not been reported for gels made by conventional processes. Most favored conditions for producing ultrafine pore structure are the combination of low mole ratio of 2:1 to 10:1 and low reaction temperature. Wet gel can be dried to produce coatings, monoliths and other shaped forms, such as optical lenses. By "dried" it is meant that the liquid residue of hydrolysis and condensation, including solvents, carboxylic acid, tetraalkoxy compound and byproducts of reaction, are removed. Volatile liquid residue can be removed by evaporation at elevated temperature and/or subatmospheric pressure. If the volatility of the liquid residue is low, high temperatures and vacuum conditions may be needed. Shaped articles can fracture if dried under such harsh conditions. To avoid the need for harsh drying conditions, volatile reactants, such as strong carboxylic acids having atmospheric boiling points below about 180° C., are preferred for use in this invention. If acids having atmospheric boiling points above 180° C. are used, they may be removed from the wet gel by alternative methods such as by extraction with a solvent boiling below 180° C. followed by evaporation of the low boiling solvent. Alternatively, mild drying conditions can be employed, but they usually must be maintained for long duration to accomplish drying.

The process of this invention has the surprising, desirable feature that no water need be added to the reactants initially and that the steady state water concentration during reaction is quite small. One of the benefits of this feature is that clear gels can be made readily without a need to use a water-miscible solvent to obtain a homogeneous medium. While water is necessary for hydrolysis, a sufficient amount is formed by reaction of strong carboxylic acid with alcohol produced by hydrolysis and by metathesis reaction (IV):

  (IV)

The process then continues as shown in equations (V) and (VI), below and then as shown above in equation (I).

$$HCOOH + ROH \rightarrow HCOOR + H_2O \quad (V)$$

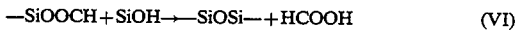  (VI)

Naturally, any water which may be present as diluent in strong carboxylic acid can contribute to hydrolysis. Strong carboxylic acid containing at most 20 mol % water is preferred for the process of this invention.

The overall, idealized, stoichiometry of the reactions occurring in the process of the present invention requires at least two moles of organic acid per mole of compound (A), as shown below in equation (VII), but it has been found in practice that satisfactory results can be obtained when the amount of organic acid is less than required, but at least 1.5 moles per mole of compound (A).

$$2\ HCOOH + Si(OR)_4 \rightarrow SiO_2 + 2ROH + 2ROOCH \quad (VII)$$

Examples of strong carboxylic acids effective in this invention include formic acid, monochloroacetic acid, dichloroacetic acid, trifluoroacetic acid and hydroxyacetic acid. Neat formic acid is chemically unstable. Reagent grade formic acid, which is typically supplied commercially with about 4–20 wt % (9.6–38.9 mol %) water is stable, however. The process of this invention has been found particularly effective with 96 wt %, reagent grade formic acid, without further addition of water. Formic acid which has been dried to about 99.5 mol % purity is also highly effective. Other strong carboxylic acids, including dichloroacetic acid and trifluoroacetic acid, for example, can exist in essentially anhydrous form having less than about 0.1 mol % water. Weaker acids, such as acetic acid, and strong mineral acids such as hydrochloric and nitric acid, are not satisfactory for use according to this invention.

FIG. 1 is a compound plot of gelation times vs. initial reactant compositions from two series of experiments, one series of which was run by V. Gottardi, et al., and reported in J. Non-cryst. Solids, 63, 71 (1984). TEOS was the tetraalkoxy compound used in both series. The abscissa is the mole ratio of hydrolytic agent to TEOS. The experiments in the series conducted according to the present invention are represented by square data points. This series was run at 20° C. and the strong carboxylic acid used was 96 wt % formic acid. In the acid-rich reactant mole ratio range of about 6–20, gelation occurs in from about 30–120 minutes. In the mole ratio range of 2–6, gelation time is found to increase to greater than about 100 hours. The Gottardi data, obtained at 60° C., are represented by the circular data points. The Gottardi experiments used water as the hydrolytic agent and the reaction system was catalyzed by hydrochloric acid. Gelation time at 20° C. was calculated for FIG. 1 by using 14 kcal/mol (58,700 J/mol) activation energy of gelation reported by M. W. Colby, et al., in J. Non-cryst. Solids 99, 129 (1988). FIG. 1 shows that gelation according to the present invention at each hydrolytic agent:TEOS mole ratio is several hundred times faster than accomplished by the conventional process.

When very highly reactive tetraalkyl titanates, such as, for example, tetraisopropyl titanate, are used in the presence of water, titanium dioxide tends to precipitate.

Clear, homogeneous gels suitable for optical applications cannot be made from such highly reactive tetraalkyl titanates and stoichiometric amounts of water, as reported in, for example, *Sol-gel Science*, C. J. Brinker et al., Academic Press, 1990, page 53. According to the present invention, titanium dioxide precipitate can be avoided by using essentially anhydrous, strong carboxylic acids, such as trifluoroacetic acid, rather than 96 wt % formic acid. Furthermore, even 96 wt % formic acid can be used to make clear gel from less reactive titanates such as tetrabutyl titanate. Therefore, the process of the present invention allows formation of gels not obtainable by conventional means.

The high gelation rate of the process of the present invention is quite unexpected. In *J. Non-cryst. Solids*, 73,681 (1985), Schmidt reports that Is in the presence of 0.002M aqueous HCl, TEOS undergoes hydrolysis approximately fifty times more slowly than does an alkyltrialkoxysilane, $(CH_3)Si(OC_2H_5)_3$. Wengrovius discloses that the reaction of alkyltrialkoxysilane with formic acid to form silicone oligomers is very slow, taking several hours or days. The combined disclosures of Schmidt and Wengrovius suggest that formation of gel by reaction of tetraalkyl orthosilicates with formic acid would be extremely slow since hydrolysis of the silicon-alkoxy bond is an essential step in the process. Surprisingly, it has been found that such gel formation occurs remarkably quickly.

Inorganic gel produced according to the present invention can be dried slowly, under mild temperature and pressure conditions to a monolithic form. Alternatively, the gel can be rapidly dried at up to 300° C. and either under vacuum or in a stream of inert gas to make a powder. Prior to complete gelation, the solution can also be applied by conventional techniques such as dip coating, spray coating and knife coating, for example, to provide coatings on various substrates. Wet gels can also be dried to produce an aerogel by extraction with supercritical fluids such as, for example, $CO_2$ and methanol, which preserves the original pore structure in the product. Such aerogels are useful as acoustic or thermal insulating materials, especially when the density of the aerogel is very low. Accordingly, it is desirable to generate wet gels of very low solids content which can serve as precursors to useful aerogels.

This invention is now illustrated by representative examples of certain preferred embodiments thereof, where all parts, proportions, and percentages are by weight, unless otherwise indicated. All units of weight and measure other than SI units have been converted to SI units. Formic acid was commercially available acid solution containing 4% water and example quantities are given on the basis of formic acid actually present, unless otherwise stated.

EXAMPLE 1

TEOS was added to formic acid in a 3.00:1 mole ratio of formic acid:TEOS at room temperature and stirred intermittently. A mildly exothermic reaction ensued during which the temperature rose to a maximum slightly above room temperature. A transparent, wet gel was produced after 23 hours at 20° C. The wet gel was dried within minutes of its formation in a rotary evaporator at 20 kPa for 30 min at 60° C. Thereafter, pressure was lowered to 15 Pa and drying was completed at 50° C. for 16 hours to produce granular, dry gel.

The dry gel was pulverized and subjected to surface area measurement by low-temperature nitrogen analysis. The dry gel sample did not show appreciable nitrogen adsorption after 4 hours, which indicated that the specific surface area was less than 10 $m^2/g$. Dry gel was analyzed by low pressure mercury porosimetry which indicated the bulk density to be 1.64 $g/cm^3$. Measurement by helium pycnometry revealed that skeletal density was 1.83 $g/cm^3$. Experimental error of the density measurements was ±0.02 $g/cm^3$. Because skeletal density was greater than bulk density, the gel had open porosity. The findings of less than 10 $m^2/g$ specific surface area and open porosity show that the gel contained ultrafine pore structure.

The same sample was then subjected to $CO_2$ analysis at 25° C. as well as at −78° C. Each $CO_2$ analysis indicated appreciable adsorption of $CO_2$, from which minimum specific surface area of 250 $m^2/g$ was calculated. Results of $CO_2$ analyses thus confirmed that the gel contained ultrafine pore structure.

EXAMPLE 2

The procedure of Example 1, was repeated with formic acid and TEOS combined in a mole ratio of 7.74:1. A clear gel formed in 41 minutes at 23° C. The gel was dried as in Example 1 then subjected to low-temperature nitrogen analysis which indicated that nitrogen had not been adsorbed to significant extent. Bulk density and skeletal density of the gel were determined to be 1.21 and 1.89 $g/cm^3$, respectively, showing that it had open porosity. Taken with the low nitrogen adsorption result, open porosity indicated that the gel had ultrafine pore structure.

Pieces of dried gel were submerged in water. The gel fractured spontaneously and bubbles of air evolved. It was concluded that the air had been trapped within the pores and was liberated by gel fracture, additionally confirming that the gel had open porosity and ultrafine pore structure.

EXAMPLE 3

The procedure of Example 2 was repeated with formic acid to TEOS mole ratio of 2.31: 1. A clear wet gel was formed in approximately 120 hours at 23° C. Again, insignificant nitrogen was adsorbed after 4 hours at −196° C. Bulk and skeletal densities were determined to be 1.41 and 1.64 $g/cm^3$, respectively, indicating that the gel had open porosity. Pieces of dried gel fractured and liberated air bubbles when submerged in water.

Examples 1-3 suggest that low to intermediate mole ratios of acid to tetraalkoxy compound favor production of gel having ultrafine pore structure.

EXAMPLE 4

At room temperature, 4.54 g of TEOS was added to 31.39 g of formic acid and stirred intermittently to produce a 31.3:1 mole ratio acid:TEOS mixture. A mildly exothermic reaction ensued during which the temperature rose to a maximum of 34.8° C. A transparent, wet gel was produced after about 120 minutes. The flask was evacuated to a pressure of 13.33 Pa for 24 hours and a powdered, dry gel resulted.

Figure 2:
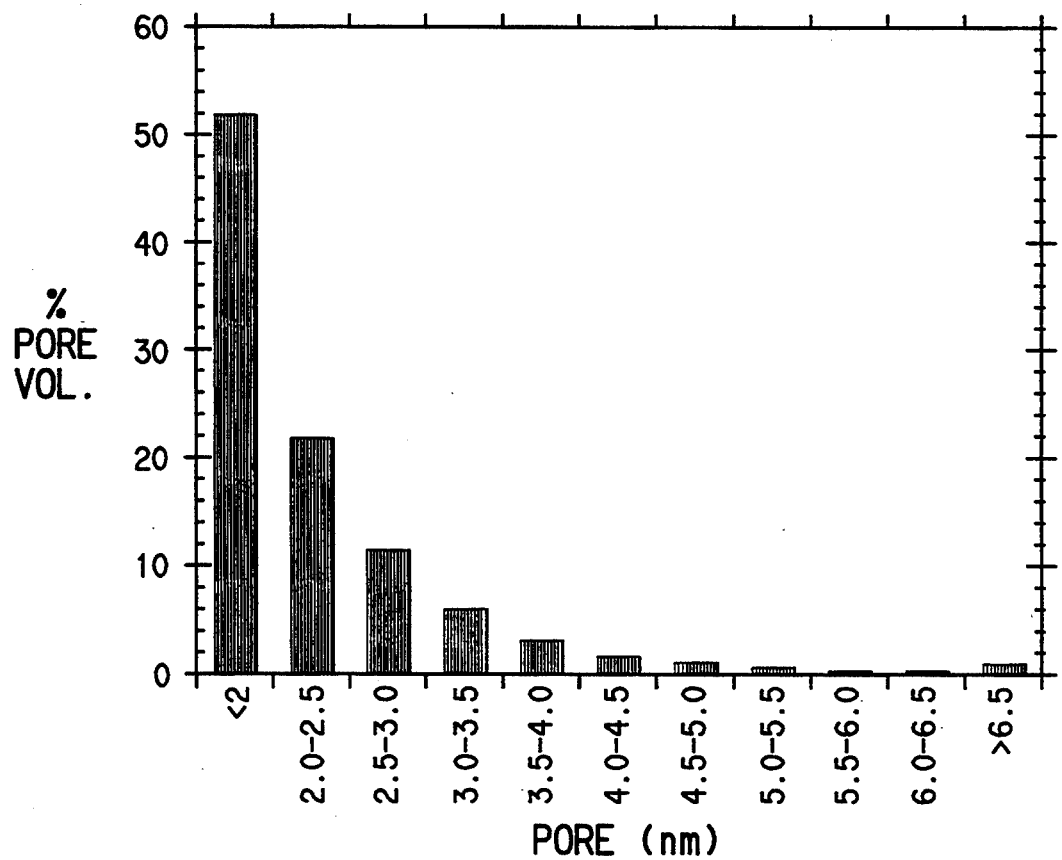
FIG. 2 is a plot of percent pore volume vs. pore size measured by nitrogen adsorption analysis at −196° C. of a gel produced by reaction of formic acid with tetraethyl orthosilicate.

The pore size distribution of the dry gel was determined by low-temperature nitrogen analysis. The results are plotted in FIG. 2 as percent pore volume vs. pore size. FIG. 2 shows that 52% percent of total detected pore volume of the sample had pore size less than 2.0 nm. The fraction of pore volume drops dramatically as pore size increases above 2.0 nm. FIG. 2 also indicates that the pore size distribution produced by the process of this invention is narrow. Specific surface area of the powdered gel was also determined by nitrogen adsorption analysis to be 570 m$^2$/g.

EXAMPLE 5

Formic acid and TEOS in initial mole ratio of 2.16 were placed in a flask. Heat was applied to control reaction temperature at 65° C. A transparent wet gel was produced after 21 hours. The gel was dried as in Example 4 for 3 hours at 70° C. but did not crumble into powder. As measured by low-temperature nitrogen analysis, average pore diameter of the dried gel was 1.9 nm and specific surface area was 577 m$^2$/g. Solids content of the gel was determined by calculation to be 19.4 percent. Liquids that were removed from the wet gel during drying were analyzed by gas chromatography which revealed the presence of ethyl formate, ethyl alcohol, and a small amount of water. No formic acid was detected because it had reacted with ethyl alcohol to form ethyl formate. As compared to Examples 1 and 2, this example suggests that higher reaction temperature produces larger pore size.

EXAMPLE 6 (Comparative)

At room temperature, TEOS was added to glacial acetic acid and stirred intermittently to produce a 9.66:1 mole ratio acid:TEOS mixture. No gel formation was detected after several weeks at room temperature.

EXAMPLE 7

Into a vessel was placed formic acid and tetra(n-propyl) orthosilicate in a mole ratio of 19.8:1. Initially, reactants were only partially miscible but a homogeneous solution was obtained after 15 minutes of stirring. After standing without further agitation for 16 hours, a transparent wet gel was produced.

EXAMPLE 8

The method of Example 4 was repeated, except that initial formic acid:TEOS mole ratio was 2.16:1. An clear gel was formed after 7 days at room temperature. Bulk density of the dried gel as determined by mercury porosimetry was 1.72 g/cm$^3$ which is high compared to that of sol-derived gel made conventionally, in the presence of stoichiometric amounts of water. High bulk density gels usually have higher hardness than low density gels and are useful for example, for scratch-resistant coatings.

EXAMPLE 9

Reagent grade, 97.7 % dichloroacetic acid was combined with TEOS in acid:TEOS mole ratio of 7.19:1 to form a solution. After standing overnight, at room temperature, a clear gel was formed.

EXAMPLE 10

TEOS (7.52 g, 36.1 mmol) was allowed to react with 5.98 g of formic acid (125 mmol) for 10 minutes in a flask. Tetra(2-ethylhexyl) titanate (1.124 g, 1.99 mmol) was then added. A clear solution resulted which formed a gel in 90 minutes. The gel was dried for approximately 16 hours at 125° C. and at a pressure of 20 kPa, and then analyzed for titanium and silicon content by the inductively coupled plasma method of ASTM standard E1277-91. This analysis revealed that the weight ratio of titanium to silicon was 0.127 indicating that both elements had been incorporated in the gel network. Complete incorporation of titanium and silicon in reactants would have produced a titanium/silicon ratio of 0.094, which suggests that titanium somewhat more efficiently incorporates into the network than does silicon.

EXAMPLE 11

The method of Example 4 was repeated, except that acid was diluted with water to 72 wt % formic acid (50 mol %). Acid to TEOS mole ratio was 8.15:1. The solution was initially clear and formed a translucent gel after 55 minutes at room temperature. After standing for several days, the gel became opaque. Opacity indicates the presence, due to the large amount of water used, of components having particles large enough to scatter visible light; nevertheless, this example demonstrates that strong carboxylic acid having as much as 50 mol % water can produce gel rapidly according to the present invention.

EXAMPLE 12

By dropwise addition of 0.643 g trifluoroacetic anhydride to 6.416 g reagent grade trifluoroacetic acid, any water initially present was converted to the acid. The anhydride added was in excess of the amount needed to convert the small amount of water. To the anhydrous trifluoroacetic acid mixture was added 1.674 g of TEOS with stirring. Mole ratio of acid to TEOS was 7.00: 1. The reaction container was placed in a temperature controlled bath maintained at 26° C. A clear gel formed 97 minutes thereafter, demonstrating that the process of this invention can operate without any water initially present. Trifluoroacetic anhydride was not observed to react with TEOS in the absence of trifluoroacetic acid.

EXAMPLE 13

Into a well thermally insulated vessel was placed formic acid and TEOS in initial mole ratio of 7.97:1. that of reaction raised internal temperature to a maximum of 53° C. After 26 minutes, a transparent wet gel was produced.

EXAMPLE 14

Commercially available trifluoroacetic acid containing 0.4 wt % water as determined by Karl-Fischer analysis was reacted with TEOS at an acid to TEOS mole ratio of 5.88: 1. Gelation was observed after 38 minutes at 23° C. The gel was dried as in Example 4. Low-temperature nitrogen analysis indicated specific surface area of 510 m$^2$/g and average pore size of 2.4 nm.

EXAMPLE 15

The method of Example 4 was repeated with formic acid to TEOS mole ratio of 16.4:1. Reactants were placed in a cylindrical vial and a few mg of rhodamine G dye was added. A bright orange solution was produced which gelled on standing overnight at room temperature. Drying at room temperature and atmospheric pressure for 24 days produced an orange cylinder approximately 6 mm in diameter and 12 mm high of gel of 1.52 g/cm$^3$ bulk density. The color was uniform throughout except for a slightly darkened region at one end of the cylinder. This example suggests the compatibility of gel produced by the process of this invention with materials which may be employed in optical applications, such as dyes for lenses or filters.

EXAMPLE 16

Formic acid and TEOS were each cooled to 2° C., then mixed in initial mole ratio of 7.69:1. Throughout mixing and reaction, temperature was maintained at 2° C. After 5 hours, a clear gel was observed.

EXAMPLE 17

A solution was prepared by dissolving 1.25 g monochloroacetic acid (13.2 mmol) in 0.73 g tetrahydrofuran (10 mmol) over a 5-minute period. While the acid solution was stirred, 0.61 g TEOS (2.9 mmol) was added and a clear solution resulted. The solution was allowed to stand at room temperature for 3 days, after which it had not gelled, illustrating that dilution by solvent can slow reaction rate. After heating to 60° C. for 22 hours the solution did form a clear gel. Thus the rate reduction was offset by increased reaction temperature.

EXAMPLE 18

Tetrabutyl titanate was placed in a small flask under inert atmosphere. Over a two-minute period, 96% formic acid was added to the flask at room temperature to make a 4.89:1 mole ratio acid:titanate mixture. An exothermic reaction was apparent, but no precipitation of titanate was observed. After 15 minutes, a clear, pale yellow gel had formed. The gel was dried at atmospheric pressure and room temperature for several weeks, after which it was dried tinder vacuum at 100° C. for approximately 16 hours. Translucent pieces of gel several millimeters in size were produced. Low- temperature nitrogen analysis indicated specific surface area of 301 m$^2$/g and average pore size of 4.2 nm.

EXAMPLE 19

Inside an inert atmosphere glove box 4.25 g tetraisopropyl titanate (19.3 mmol) was placed into a small flask. While contents of the flask were stirred at room temperature, 7.33 g anhydrous trifluoroacetic acid (64.3 mmol) was slowly added. An exothermic reaction was apparent, but no precipitation of titanium dioxide was observed. After 17 hours, a clear, pale yellow gel had formed. The gel remained clear after drying at room temperature and atmospheric pressure for several weeks. This example demonstrates that highly reactive tetraalkyl titanate, which typically precipitates titanium dioxide during hydrolysis in the presence of stoichiometric amounts of water used in conventional gel formation, was capable of producing a homogeneous gel by the process of this invention.

EXAMPLE 20 (Comparative)

Water, TEOS, and ethanol were combined in a 2:1:5 mole ratio. Ethanol was necesssary to maintain miscibility. The resulting solution was divided into several portions, to which varying amounts of 96% formic acid were added. Those samples were placed in sealed containers and thermostatted at 60° C. The gelation times of those samples are reported in the table below:

| Mole ratio HCOOH/TEOS | Gel time, hrs. |
| --- | --- |
| 0.010 | 31 |
| 0.056 | 193 |
| 0.101 | 214 |
| 0.201 | 173 |

The above data confirm the observation made by Coltrain, loc. cit., that with an acid as a catalyst in an aqueous medium, gelation times increase with acid concentration. The process of the present invention, which requires larger amounts of acid and can operate in an initially nonaqueous medium or in the presence of a small amount of water, produces gelation in very short times, usually minutes, rather than hours.

I claim:

1. A process for making open pore, inorganic gel, comprising:
   (1) intimately mixing together the following components (A) and (B), either in a liquid state or in solution in an organic liquid:
      (A) at least one compound selected from the group consisting of Si(OR$^1$)$_4$, Ti(OR$^2$)$_4$, Zr(OR$^3$)$_4$, Ti$^a$(OR$^4$)$_n$X$^d_p$, and Zr$^b$(OR$^5$)$_n$X$^d_p$ wherein each one of R$^1$, R$^2$, R$^3$, R$^4$, and R$^5$ independently is a C$_1$-C$_8$ alkyl;
      X is a chelating ligand;
      a and b is a coordination number having an integer value of 4-6;
      d is a number corresponding to the chelating ability of ligand X, being 2 for bidentate chelating ligands and 3 for tridentate chelating ligands;
      p is either 1 or 2, with the proviso that p is 1 for tridentate chelating ligands;
      n=a−d•p; and
      (B) a strong carboxylic acid, having a pK$_a$ value not higher than about 4.0, and containing from 0 to 40 mole % water, the amount of carboxylic acid being at least 1.5 moles of —COOH groups per mole of compound (A), and the total amount of water from any source initially present in the reaction medium being less than 5 moles per mole of Component (A);
   (2) agitating the above mixture while maintaining the mixture at a temperature within the range of about 0° to 100° C.; and
   (3) isolating the inorganic gel.

2. A process of claim 1 wherein (A) and (B) are mixed in a mole ratio of (B):(A) from 2:1–40:1.

3. A process of claim 1 wherein the strong carboxylic acid contains at most 20 mole % water.

4. A process of claim 1 wherein temperature is maintained within the range from 0° to 60° C.

5. A process of claim 1 wherein the amount of carboxylic acid is at least 2 moles of —COOH groups per mole of compound (A).

6. A process of claim 1 wherein the total amount of water initially present in the reaction medium is less than 1 mole per mole of compound (A).

7. A process of claim 1 wherein R$^1$ is a C$_1$-C$_4$ alkyl.

8. A process of any one of claims 1 through 7 wherein the strong carboxylic acid is selected from the group consisting of formic acid, monochloroacetic acid, dichloroacetic acid, trifluoroacetic acid and hydroxyacetic acid.

9. A process of claim 8 wherein the strong carboxylic acid is formic acid.

* * * * *